United States Patent
Zhang et al.

(10) Patent No.: US 12,546,828 B2
(45) Date of Patent: Feb. 10, 2026

(54) ELECTROCHEMICAL MODEL-BASED METHOD AND SYSTEM FOR ESTIMATING STATE OF SOLID-STATE LITHIUM BATTERY

(71) Applicant: SHANGHAI FIRM-LITHIUM NEW ENERGY TECHNOLOGY CO., LTD., Shanghai (CN)

(72) Inventors: Xi Zhang, Shanghai (CN); Chenghao Liu, Shanghai (CN); Bangjun Guo, Shanghai (CN); Chong Zhu, Shanghai (CN); Guodong Fan, Shanghai (CN)

(73) Assignee: SHANGHAI FIRM-LITHIUM NEW ENERGY TECHNOLOGY CO., LTD., Shanghai (CN)

( * ) Notice: Subject to any disclaimer, the term of this patent is extended or adjusted under 35 U.S.C. 154(b) by 47 days.

(21) Appl. No.: 18/688,498

(22) PCT Filed: Aug. 18, 2022

(86) PCT No.: PCT/CN2022/113367
§ 371 (c)(1),
(2) Date: Mar. 1, 2024

(87) PCT Pub. No.: WO2023/030024
PCT Pub. Date: Mar. 9, 2023

(65) Prior Publication Data
US 2025/0123331 A1 Apr. 17, 2025

(30) Foreign Application Priority Data
Sep. 1, 2021 (CN) .......................... 202111022903.6

(51) Int. Cl.
*G01R 31/367* (2019.01)
*G01R 31/36* (2020.01)
(Continued)

(52) U.S. Cl.
CPC ....... *G01R 31/367* (2019.01); *G01R 31/3648* (2013.01); *G01R 31/378* (2019.01); *G01R 31/3842* (2019.01); *G06F 30/20* (2020.01)

(58) Field of Classification Search
CPC .............. G01R 31/367; G01R 31/3648; G01R 31/378; G01R 31/3842; G06F 30/20
See application file for complete search history.

(56) References Cited

U.S. PATENT DOCUMENTS

| | | |
|---|---|---|
| 2011/0054816 A1 | 3/2011 | Prada et al. |
| 2018/0198300 A1 | 7/2018 | Howey et al. |
| 2023/0305066 A1* | 9/2023 | Kim ................. H01M 10/0525 |

FOREIGN PATENT DOCUMENTS

| | | |
|---|---|---|
| CN | 104899439 A | 9/2015 |
| CN | 104991980 A | 10/2015 |

(Continued)

OTHER PUBLICATIONS

International Search Report and Written Opinion for International Application No. PCT/CN2022/113367 mailed Nov. 28, 2022.

(Continued)

*Primary Examiner* — John C Kuan
(74) *Attorney, Agent, or Firm* — Ballard Spahr LLP (57) ABSTRACT

Provided are an electrochemical model-based method and system for estimating a state of a solid-state lithium battery, where the method includes: a model construction step, for constructing an electrochemical model of a power solid-state lithium battery; and a code generation step, for converting the electrochemical model after simulated into executable code and importing the executable code into a battery management system to estimate the state of the power solid-state lithium battery.

10 Claims, 2 Drawing Sheets

(51) Int. Cl.
  *G01R 31/378*   (2019.01)
  *G01R 31/3842*  (2019.01)
  *G06F 30/20*    (2020.01)

(56) References Cited

FOREIGN PATENT DOCUMENTS

| | | | | |
|---|---|---|---|---|
| CN | 107066722 A | | 8/2017 | |
| CN | 110412483 A | | 11/2019 | |
| CN | 110888056 A | * | 3/2020 | ........... G01R 31/367 |
| CN | 110888057 A | | 3/2020 | |
| CN | 111177924 A | | 5/2020 | |
| CN | 111239610 A | | 6/2020 | |
| CN | 113933713 A | | 1/2022 | |

OTHER PUBLICATIONS

Office Action for Chinese Application No. 202111022903.6 mailed Feb. 19, 2023.
Office Action for Chinese Application No. 202111022903.6 mailed Nov. 23, 2022.

\* cited by examiner

ELECTROCHEMICAL MODEL-BASED METHOD AND SYSTEM FOR ESTIMATING STATE OF SOLID-STATE LITHIUM BATTERY

CROSS-REFERENCE TO RELATED APPLICATION

This patent application is a U.S. national stage of PCT International Application No. PCT/CN2022/113367, filed on Aug. 18, 2022, which claims priority to Chinese Patent Application No. 202111022903.6 filed with the China National Intellectual Property Administration on Sep. 1, 2021. Both of the aforementioned applications are hereby incorporated by reference in their entireties.

TECHNICAL FIELD

The present disclosure relates to the technical field of battery state estimation, and in particular to an electrochemical model-based method and system for estimating a state of a solid-state lithium battery.

BACKGROUND

The current research for solid-state lithium-ion battery, which is likely to become the power energy system of the next generation of electric vehicles, has come close to real vehicle application and large scale production. However, it is difficult to fully exert the advantages of high energy density and high power density of solid-state batteries based on the equivalent circuit model used in the traditional real vehicle battery management system to estimate and manage the battery state. Therefore, it is necessary to design a brand-new electrochemical model management method based on the actual electrochemical principle inside solid-state batteries, so as to achieve full performance of power solid-state batteries.

In addition, although the research and development of power batteries for electric vehicles has become a hot research topic at present, accurate estimation of state of charge (SOC) and state of health (SOH) of solid-state batteries, in various functions of a battery management system (BMS) for managing the batteries, is still a key technical problem to be solved urgently.

A method for modeling a liquid lithium-ion battery mechanism is disclosed in Chinese invention patent document with publication No. CN104899439A. The method includes the following steps: (1) establishing a single-particle model of a lithium-ion battery; (2) simplifying a solid-phase diffusion equation in the single-particle model of the lithium-ion battery using a three-parameter parabolic method; (3) identifying unknown parameters in the single-particle model of the lithium-ion battery using a bacterial foraging optimization algorithm; and (4) fitting an expression of an open-circuit voltage of a positive electrode of the single-particle model of the lithium-ion battery. In this document, the structure of the single-particle model of the lithium-ion battery is simplified using the three-parameter parabolic method; the unknown parameters in the single-particle model of the lithium-ion battery are identified using the bacterial foraging optimization algorithm, the identification speed is fast and a global optimal solution is obtained. This document provides theoretical support for state estimation, life prediction and characteristic analysis of lithium-ion batteries. These precise state estimations must be based on an accurate battery model. Most of the previous research models are porous electrode model, but the solid-state battery has an obvious interface with electrolytes, and reactions only occur at the interface, so a new model is needed to describe the solid-state battery.

In view of the above prior art, the inventors believe that it is difficult to fully exert the advantages of high energy density and high power density of a solid-state battery and accurately express a true operating state of the battery by using an equivalent circuit model to estimate and manage a battery state in the traditional real vehicle battery management system.

SUMMARY

For the defects in the prior art, a purpose of the present disclosure is to provide an electrochemical model-based method and system for estimating a state of a solid-state lithium battery.

An electrochemical model-based method for estimating a state of a solid-state lithium battery according to the present disclosure includes:

a model construction step, for constructing an electrochemical model of a power solid-state lithium battery; and a code generation step, for converting the electrochemical model after simulated into executable code and importing the executable code into a battery management system to estimate the state of the power solid-state lithium battery.

In this embodiment, the model construction step includes: constructing the electrochemical model, which includes establishing a transfer function between an output voltage and an input current of the power solid-state lithium-ion battery.

In this embodiment, the model construction step includes: transforming and solving an internal electrochemical reaction control equation of the power solid-state lithium battery to establish a transfer function of a terminal voltage to a current, and performing order reduction on the transfer function of the terminal voltage to the current to obtain a rational transfer function based on electrochemical parameters.

In this embodiment, the model construction step includes: obtaining the electrochemical model by modeling, solving and simplifying partial differential control equations for expressing various parts inside the power solid-state lithium battery.

In this embodiment, the electrochemical model is subjected to mathematical decoupling and model discretization to generate model code, and the model code is imported into the battery management system to estimate the state of the power solid-state lithium battery. The state of the power solid-state lithium battery includes a state of charge of the battery, a state of health of the battery, a state of power of the battery, and a temperature of the battery.

An electrochemical model-based system for estimating a state of a solid-state lithium battery according to the present disclosure includes:

a model construction module, configured to construct an electrochemical model of a power solid-state lithium battery; and a code generation module, configured to convert the electrochemical model after simulated into executable code and import the executable code into a battery management system to estimate the state of the power solid-state lithium battery.

In this embodiment, the model construction module is configured to: constructing the electrochemical model, which includes establishing a transfer function between an output voltage and an input current of the power solid-state lithium-ion battery.

In this embodiment, the model construction module is configured to: transform and solve an internal electrochemical reaction control equation of the power solid-state lithium battery to establish a transfer function of a terminal voltage to a current, and then perform order reduction on the transfer function of the terminal voltage to the current to obtain a rational transfer function based on electrochemical parameters.

In this embodiment, the model construction module is configured to: obtain the electrochemical model by modeling, solving and simplifying partial differential control equations for expressing various parts inside the power solid-state lithium battery.

In this embodiment, the electrochemical model is subjected to mathematical decoupling and model discretization to generate model code, and the model code is imported into the battery management system to estimate the state of the power solid-state lithium battery; the state of the power solid-state lithium battery includes a state of charge of the battery, a state of health of the battery, a state of power of the battery, and a temperature of the battery.

BRIEF DESCRIPTION OF THE DRAWINGS

Other features, objectives and advantages of the present disclosure will become more apparent by reading the detailed description of non-limiting embodiments with reference to the following drawings.

DETAILED DESCRIPTION OF THE EMBODIMENTS

The present disclosure is further described below with reference to specific embodiments. The following embodiments will help those skilled in the art to further understand the present disclosure, without limiting the present disclosure in any form. It should be noted that, for those of ordinary skill in the art, various modifications and improvements can be made without departing from the concept of the present disclosure, which all fall within the scope of protection of the present disclosure.

Figure 1:
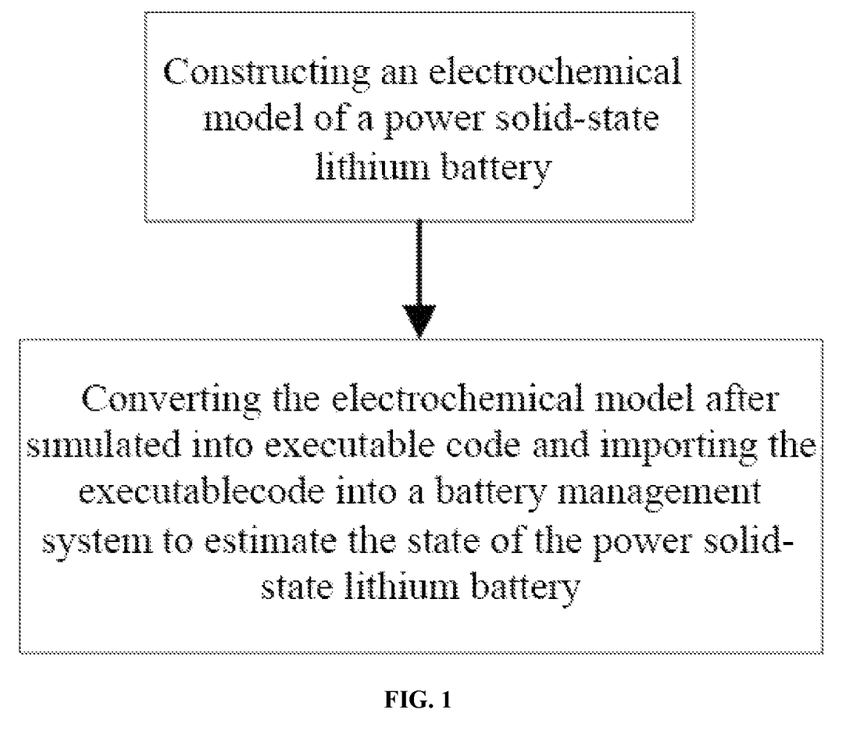
FIG. 1 is a flow diagram of an embodiment of the present disclosure.
Figure 2:
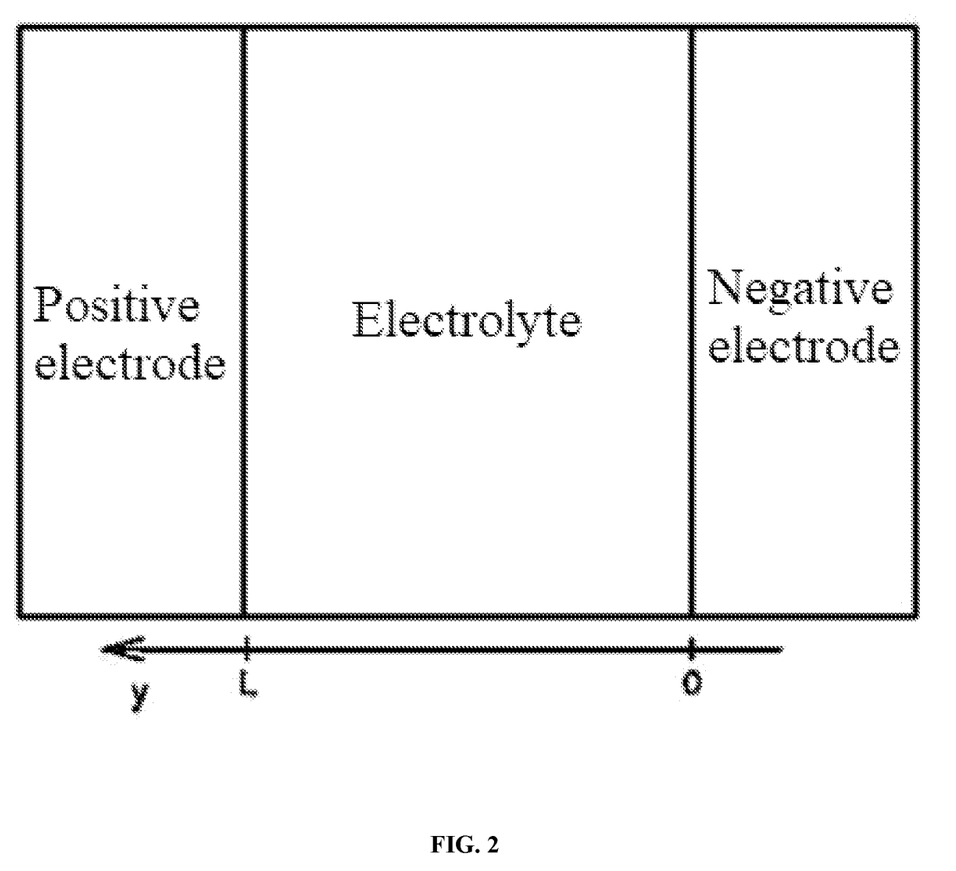
FIG. 2 is a schematic diagram of an internal battery structure of an electrochemical model of a power solid-state lithium-ion battery according to one embodiment of the present disclosure.

Disclosed by the embodiment of the present disclosure are an electrochemical model-based method and system for estimating a state of a solid-state lithium battery. As shown in FIG. 1 and FIG. 2, the method includes the following steps:

A model construction step: an electrochemical model of a power solid-state lithium battery is constructed, where constructing the electrochemical model includes establishing a transfer function between an output voltage and an input current of the power solid-state lithium-ion battery. An internal electrochemical reaction control equation of the power solid-state lithium battery is transformed and solved to establish a transfer function of a terminal voltage to a current, and the transfer function of the terminal voltage to the current is subjected to order reduction to obtain a rational transfer function based on electrochemical parameters. The electrochemical model is obtained by modeling, solving and simplifying partial differential control equations for expressing various parts inside the power solid-state lithium battery. The model can accurately express an actual internal structure and a reaction state of the battery.

A power battery electrochemical model is to establish a transfer function relationship between the output voltage and the input current of the lithium-ion battery. A control equation of the battery electrochemical model is solved in an s domain. Assuming that an input of a battery system is a current I, and an output is a voltage V, a desired transfer function G(s) of the battery system is as follows:

$$G(s) = \frac{V(s)}{I(s)} = \frac{a_0 + a_1 s + \ldots + a_n s^n}{b_0 + b_1 s + \ldots + b_m s^m};$$

where s to $s^n$ and s to $s^m$ are divided regions in the s domain inside the battery, $a_0$ to $a_n$ are divided regions of a battery voltage in the s domain, $b_0$ to $b_m$ are divided regions of a battery current in the s domain, I(s) is Laplace transform of the input current, V(s) is Laplace transform of the output voltage, n represents the number of terms of a numerator part of Pade approximation, and m represents the number of terms of a denominator part of the Pade approximation.

By obtaining the transfer function of each voltage component in the battery system with respect to the current I and adding the transfer functions, the transfer function of the output voltage of the battery system to the input current, that is, an impedance model of the battery system, can be obtained. The model construction steps include: (1) The equations involved in the battery system are nonlinear, and the transfer function obtained in the process of solving is not necessarily in the form of rational polynomial, so the obtained transfer function needs to be simplified to some extent. Under a condition of giving a target approximation order, the Pade approximation method is used to approximately express any function as a ratio of two groups of rational polynomials.

(2) The output voltage of the battery system includes open-circuit potential of positive and negative electrodes of the battery, which is related to the surface ion concentration in solid-phase particles. Here, the open-circuit potential of the positive and negative electrodes of the battery is a function of the surface ion concentration of the particles of the positive and negative electrodes of the battery, and there is a one-to-one correspondence between the potential and the surface lithium-ion concentration of the positive and negative electrodes. In the lithium-ion battery, a ratio of the surface ion concentration of a solid-phase particle to the maximum ion concentration in the electrode is usually defined as a chemical equivalent $$\theta = \frac{c_{s,sur}}{c_{s,max}}.$$

$c_{s,sur}$ is the surface lithium-ion concentration, and $c_{s,max}$ is the maximum lithium-ion concentration.

(3) By establishing the relationship between the particle surface ion concentration and the current, the relationship between the open-circuit potential of the positive and negative electrodes and the current in the battery system can be established. The ion concentration control equation and boundary conditions in the solid-phase electrode are described by Fick's second diffusion law:

$$\frac{\partial c_s(x, t)}{\partial t} = \frac{\partial}{\partial x}\left(D_s \frac{\partial c_s(x, t)}{\partial x}\right).$$

$c_s$ is the ion concentration of the lithium ion in spherical particles of a solid-phase electrode, t is time distribution dimension of the lithium ion, x is space distribution dimension of the lithium ion, $\partial$ is a variational symbol, $c_s(x,t)$ represents the ion concentration of the lithium ion at the solid-phase electrode at time t at electrode coordinates x, $\partial t$ represents a variation of t, $\partial x$ represents a variation of x, $\partial c_s(x, t)$ represents a variation of $c_s(x, t)$.

The boundary conditions corresponding to the equation are as follows:

$$D_s \frac{\partial c_s(x, t)}{\partial x}\bigg|_{x = L_s} = 0;$$

$$D_s \frac{\partial c_s(x, t)}{\partial x}\bigg|_{x = 0} = -\frac{j^{Li}(x, t)}{F};$$

$D_s$ is a diffusion coefficient of the lithium ion in the spherical particle of the solid-phase electrode, $j^{Li}(x,t)$ is electrochemical reaction rate of the positive and negative electrodes at time t at x, $L_s$ is an electrode thickness, and F is a Faraday constant, with a value of 96487 C/mol.

(4) An unsteady partial differential equation is obtained by obtaining an analytical solution of the transfer function of the ion concentration of the solid-phase electrode to the current, and the partial differential equation is subjected to Laplace transform and is solved in the s domain. Finally, the transfer function of the solid-phase electrode particle surface ion concentration $C_s(0, s)$ and $C_s(x=Ls, s)$ to the electrochemical reaction rate $J^{Li}(x, s)$ can be obtained as follows:

$$\frac{C_S(0, s)}{j^{Li}(s)} = \frac{1 + \exp\left(2L_s \sqrt{\frac{s}{D_S}}\right)}{\sqrt{D_s s} F\left(-1 + \exp\left(2L_s \sqrt{\frac{s}{D_S}}\right)\right)};$$

$$\frac{C_s(L_s, s)}{j^{Li}(s)} = \frac{2 \exp\left(L_s \sqrt{\frac{s}{D_S}}\right)}{\sqrt{D_s s} F\left(-1 + \exp\left(2L_s \sqrt{\frac{s}{D_S}}\right)\right)}.$$

In the equation, $J^{Li}(s)$ is Laplace transform of $J^{Li}(x, s)$.

(5) A certain overvoltage may be generated at a contact position between the positive and negative electrodes of the lithium-ion battery and an electrolyte due to electrochemical reaction, and the reaction process can be described by Bulter-Volmer equation:

$$j^{Li}(x, t) = i_0\left[\exp\left(\frac{a_a F}{RT}\eta(x, t)\right) - \exp\left(-\frac{a_c F}{RT}\eta(x, t)\right)\right];$$

where $a_a$ and $a_c$ are transfer coefficients of an anode and a cathode, respectively, with a value of 0.5; $\eta(x,t)$ is an electrode overvoltage, $i_0$ is an electrode reaction exchange current density, R is an ideal gas constant, which is 8.3143 j/(mol k), and T is a thermodynamic temperature.

(6) An exponential function at a right end of the Bulter-Volmer equation is subjected to first-order Taylor expansion at a zero point, and then is subjected to Laplace transform to obtain following relationship:

$$j^{Li}(x, s) = \frac{i_0((a_a + a_c)F}{RT}N(x, s),$$

where N(x,s) is overpotential of the electrochemical reaction of the battery.

Therefore, the transfer function of the overpotential to the electrochemical reaction rate after lace transform in the electrochemical model of the lithium-ion battery can be obtained:

$$\frac{N(x, s)}{J^{Li}(x, s)} = \frac{RT}{i_0(a_a + a_c)F}.$$

(7) An electrolyte potential control equation in the electrochemical equation involves electrolyte potential and the lithium-ion concentration in the electrolyte. Based on the linearization of the equation, the simplified equation expression is as follows:

$$\kappa^{eff} \frac{\partial^2 \phi_e(x, t)}{\partial x^2} + \frac{\kappa_d^{eff}}{c_{e,0}} \frac{\partial^2 c_e(x, t)}{\partial x^2} + j^{Li}(x, t) = 0;$$

$\phi_e(x, t)$ is an electrolyte potential difference at time t at x of the electrolyte, $c_e(x, t)$ is the ion concentration of the lithium ion at time t at x of the electrolyte, $a_s$ is a specific surface area parameter of an electrode particle, and $k_d^{eff}$ represents effective ion diffusion conductivity of the electrolyte.

A mathematical integration operation is carried out along the x direction to obtain:

$$\kappa^{eff} \frac{\partial \phi_e(x, t)}{\partial x} - \kappa^{eff} \frac{2RT(1 - t_+^0)}{Fc_{e,0}} \frac{\partial c_e(x, t)}{\partial x} + \int_0^x j^{Li}(x, t)d\xi = 0.$$

In the equation, $t_+^0$ represents ion transfer rate of the lithium ion in an electrolyte solution considering an electrolyte solution rate, $\partial \phi_e(x,t)$ represents a variation of $\phi_e(x, t)$, $\partial c_e(x, t)$ represents a variation of the $c_e(x, t)$, and $\xi$ represents an integral factor.

(8) A mathematical integration operation is carried out again along the x direction to obtain an expression of an electrolyte potential difference in the electrochemical model:

$$\phi_e(x, t) - \phi_e(0, t) = \int_0^x \left(\frac{2RT(1 - t_+^0)}{c_{e,0}F} \frac{\partial c_e(\xi, t)}{\partial \xi}\right)d\xi + \frac{I(t)L}{A\kappa^{eff}}$$

in the equation, L is the length of an electrolyte region, $k^{eff}$ is effective conductivity of the electrolyte, I(t) is a load current, $\partial c_e(\xi, t)$ represents a variation of $c_e(\xi, t)$, $c_e(\xi, t)$ is the ion concentration of the lithium ion at $\xi$ of the electrolyte at time t, $\partial \xi$ represents a variation of $\xi$, and $\xi$ represents an integral factor.

As the lithium ions in the electrolyte are distributed in the whole battery region, the matter conservation equation of the lithium ion in the electrolyte is as follows:

$$\frac{\partial c_e(x, t)}{\partial t} = D_e^{eff} \frac{\partial^2 c_e(x, t)}{\partial x^2}$$

$D_e^{eff}$ is an effective diffusion coefficient of the lithium ion in the electrolyte.

(9) The transfer function of the electrolyte potential difference to the current can be obtained by combining the relationship between the electrochemical reaction rate and the current:

$$\frac{\Delta \Phi_e(s)}{I(s)} = \frac{\Phi_e(L, s) - \Phi_e(0, s)}{I(s)} = \frac{2RT(1-t_+^0)}{c_{e,0}F}\left(\frac{C_e(L, s)}{J_p^{Li}(s)}\frac{J_p^{Li}(s)}{I(s)} - \frac{C_e(0, s)}{J_n^{Li}(s)}\frac{J_n^{Li}(s)}{I(s)}\right) + \frac{L}{A\kappa^{eff}};$$

$\Delta\Phi_e(s)$ is the change rate of an internal potential of the battery current, $I(s)$ is the Laplace transform of the battery current, $\Phi_e(L, s)$ is the internal potential of the battery, A is the area of an electrode plate, L is the length of an electrolyte region, $\kappa^{eff}$ is the effective conductivity of the electrolyte, $c_{e,0}$ is the initial concentration of the electrolyte, $C_e(L, s)$ is Laplace transform of the electrolyte concentration at L, and $J_p^{Li}(s)$ and $J_n^{Li}(s)$ are reaction rates of the positive and negative electrodes, respectively.

The electrochemical model system can accurately estimate the state of charge (SOC) and state of health (SOH) of a real vehicle battery and optimize charging control by means of bidirectional communication. After the electrochemical model is embedded in the battery management system, accurate SOC and SOH estimation of the electric vehicle in the whole life cycle and all climate conditions can be achieved, especially an accurate estimation of the power battery system of the electric vehicle after battery aging (after 500 charge-discharge cycles) and low temperature (no more than −10° C.).

Code generation step is as follows: The stimulated electrochemical model is converted into executable code that is imported into a battery management system for estimating the state of the power solid-state lithium battery. The electrochemical model is subjected to mathematical decoupling and model discretization to generate model code, and the model code is imported into the battery management system to estimate the state of the power solid-state lithium battery. The state of the power solid-state lithium battery includes a state of charge of the battery, a state of health of the battery, a state of power of the battery, and a temperature of the battery. The processing of the electrochemical model includes mathematical decoupling and model discretization.

The code generation step includes a step of converting the battery electrochemical model into executable C language code. The simplified battery electrochemical model is built in a module of MATLAB (a combination of matrix and laboratory, which means matrix factory), and a continuous mathematical model is discretized. After discretization, the model can be converted into compilable C code. (1) Firstly, for the electrochemical model of a second-order power battery based on the type of transfer function, by using the minimal realization principle of the control system, the model is built in Simulink after a battery voltage V, a current I, a temperature T and various parameters inside the battery in the electrochemical model are converted in Simulink of MATLAB. (2) Secondly, for a continuous integration module, the battery electrochemical model in MATLAB is discretized, and meanwhile an accumulator and a zero-order holder are adopted, so as to meet the discretization requirements of the battery management system for data processing. (3) Finally, the battery electrochemical model after discretization in MATLAB is compiled, and a mathematical relationship between external characterization parameters of the battery, such as voltage, current, impedance and temperature, and internal electrochemical parameters of the battery, such as the lithium ion concentration, a battery open-circuit voltage, battery aging characterization, solid electrolyte interface (SEI) negative electrode lithium deposition, etc., is established, and the mathematical relationship is compiled to obtain the executable code of the battery electrochemical model. Simulink is a visual simulation tool and a module diagram environment.

The code generation step also includes a step of converting the battery electrochemical model into executable C code, and then converting the C code into an executable Hex language of a vehicle-mounted CANoe of the electric vehicle. (1) The C language code of the battery electrochemical model is compiled in a compiler and converted into executable code for a vehicle controller. (2) A project is created with the battery electrochemical model code in the compiler in a CANoe environment, then the C language code of the battery electrochemical model code is copied to the project directory, and the project with the model is compiled with the compiler. (3) The project with the model is compiled into a correct hexadecimal Hex file, and then the hexadecimal Hex file is flashed into a BMS controller of the battery management system of electric vehicle through CANoe software, so as to achieve the operation of the electrochemical model in the real vehicle environment. The CANoe is called CAN open environment, and its Chinese translation is bus development environment. Hex is called Intel HEX, and the file is an ASCII text file composed of lines of text conforming to Intel HEX file format.

The code generation step also includes: importing the model code into a vehicle-mounted BMS, and accurately predicting and monitoring key parameters, such as an SOC of the battery, an SOH of the battery, a state of power (SOP) of the battery and a battery temperature (T), of the vehicle-mounted power battery. The model code is converted from the battery electrochemical model, and the adopted battery electrochemical model is simplified and converted into a discrete executable code model. After the model is imported into the final battery management system, combined with sensors and a state estimation algorithm in the BMS of the vehicle, the SOC, SOH and SOP of the vehicle-mounted battery of the electric vehicle can be accurately estimated.

In addition, after being imported into the vehicle-mounted battery management system, the battery electrochemical model can effectively control the state of charge, the state of health, the power and temperature of the battery. Through cooperation, the model can control a bad temperature rise of the battery and inhibit battery aging.

In the present disclosure, the electrochemical model of the power solid-state lithium battery is constructed. The constructed electrochemical model is converted into an equivalent circuit mode expressed by electrochemical parameters by mathematical transformation. The stimulated equivalent circuit model is converted into executable code that is imported into the battery management system for estimating the state of the power solid-state lithium battery. The method and system provided by the prevent disclosure have wide applicability and can be applied to various types of solid-state lithium batteries (the types of solid-state lithium batteries include an inorganic oxide type, a sulfide type, and a polymer type).

The test results of the real vehicle show that according to the electrochemical model-based method for estimating the state of the solid-state lithium battery for a vehicle, a basic battery model is set as a lithium-ion electrochemical model of a solid-state electrolyte, which includes parameter information in the mathematical model. The electrochemical model is subjected to mathematical decoupling and model discretization to generate model code, mainly including the steps of transforming the mathematically processed electrochemical model into the executable code of the vehicle-mounted battery management system through software tools such as MATLAB, and finally importing the generated model C code into the vehicle-mounted BMS system through tools such as Hex in CANoe for execution. On the one hand, the accurate estimation of the state of charge of the battery, the state of health of the battery and the state of power of the battery by the vehicle-mounted battery management system can be improved, and on the other hand, the bad battery temperature change and battery aging can be inhibited and eliminated, thus improving the overall performance of the vehicle-mounted battery.

In the present disclosure, the model for predicting parameters of the power battery has universality and can be directly used in various battery systems. For example, in the battery management systems of the electric vehicles powered by a lithium iron phosphate battery, a ternary lithium battery and a solid-state lithium battery, the battery electrochemical model have high accuracy, strong dynamic responsiveness of the system, and wide applicability in real vehicles.

As shown in FIG. 2, the side reaction mechanism in the negative electrode of the lithium-ion battery is mainly a series of chemical reactions between the lithium ion and an electrolyte solvent. Combined with the side reaction equation of the negative electrode of the battery, the electrochemical model of the battery is established. In FIG. 2, y represents thickness coordinates of a solid-state battery with the normal of the electrode plate area as a direction.

A pseudo-two-dimensional electrochemical model includes the mathematical relationships of several key electrochemical state variables, such as the concentration of positive and negative electrodes, an open-loop voltage platform, electrolyte phase potential and reaction overpotential, as well as the specific composition and expression of the final output voltage. In addition, the interaction of various electrochemical effects in the battery can also be displayed intuitively in the pseudo-two-dimensional electrochemical model.

Those skilled in the art know that, in addition to achieving the system and its devices, modules and units in the form of pure computer-readable program codes, the system provided by the present disclosure and its devices, modules and units can achieve the same functions in the form of logic gates, switches, application-specific integrated circuits, programmable logic controllers and embedded microcontrollers by logically programming the method steps. Therefore, the system provided by the present disclosure and its various devices, modules and units can be regarded as a hardware component, and the devices, modules and units for achieving various functions included therein can also be regarded as structures in the hardware component. Devices, modules, and units for achieving various functions may also be regarded as either a software module for implementing a method or a structure within a hardware component.

Compared with the prior art, the present disclosure has the following beneficial effects:
1. The present disclosure can accurately express the real operating state of the battery, and the model is completely applicable to a real vehicle application environment through mathematical processing and code conversion.

The electrochemical model in the battery management system can accurately express the battery, thus accurately estimating and monitoring the battery state. The battery state is effectively expressed by the electrochemical parameters of the battery, which makes the electrochemical model compatible and applicable. The established electrochemical model can be subjected to order reduction, simplification and discretization, such that the model can be converted into executable code which is convenient for application in real vehicles.

The electrochemical model-based method for estimating and constructing a state of a vehicle power solid-state lithium battery can be applied to a real vehicle battery management system, which provides a good application prospect for the battery management of the electric vehicle, and has significant advantages compared with the battery state estimation and management method mainly based on the equivalent circuit model.

The specific embodiments of the present disclosure have been described above. It should be understood that the present disclosure is not limited to the above specific embodiments, and those skilled in the art can make various changes or modifications within the scope of the claims without affecting the essence of the present disclosure. In case of no conflict, the embodiments of the present disclosure and the features in the embodiments can be arbitrarily combined with each other.

What is claimed is:
1. An electrochemical model-based method for estimating a state of a solid-state lithium battery, comprising:
   detecting, by a battery management system, a current, a voltage, an impedance and a temperature of the solid-state lithium battery;
   estimating, according to the current, the voltage, the impedance and the temperature of the solid-state lithium battery, lithium ion concentration, battery open-circuit voltage, solid electrolyte interface (SEI) for characterizing battery aging and negative electrode lithium deposition of the solid-state lithium battery, by using an electrochemical model of the solid-state lithium battery; wherein the electrochemical model of the solid-state lithium battery is flashed into the battery management system as follow:
   a model construction step, for constructing the electrochemical model of the solid-state lithium battery;
   a code generation step, for building a simulation model of the electrochemical model for simulation such that a mathematical relationship between external characterization parameters of the solid-state lithium battery, comprising the voltage, the current, the impedance and the temperature, and internal electrochemical parameters of the solid-state lithium battery, comprising the lithium ion concentration, the battery open-circuit voltage, the SEI and the negative electrode lithium deposition, is established, converting the stimulation model after simulated into executable code and importing the executable code into the battery management system for estimating the state of the solid-state lithium battery;
wherein the model construction step comprises:
  solving a control equation of a battery electrochemical model in an s domain; and assuming that an input of a battery system is a current I, and an output is a voltage V, obtaining a transfer function G(s) of the battery system as follows:

$$G(s) = \frac{V(s)}{I(s)} = \frac{a_0 + a_1 s + \ldots + a_m s^n}{b_0 + b_1 s + \ldots + b_m s^m};$$

where, s to $s^n$ and s to $s^m$ are divided regions in the s domain inside the battery, $a_0$ to an are divided regions of a battery voltage in the s domain, $b_0$ to $b_m$ are divided regions of a battery current in the s domain, I(s) is Laplace transform of an input current, V(s) is Laplace transform of an output voltage, n represents a number of terms of a numerator part of Pade approximation, and m represents a number of terms of a denominator part of the Pade approximation;

obtaining a transfer function of the output voltage of the battery system to the input current as an impedance model of the battery system, by obtaining transfer functions of respective voltage components in the battery system with respect to the current I and adding the transfer functions;

as equations involved in the battery system are nonlinear, and transfer function obtained in a process of solving is probably not in the form of rational polynomial, simplifying the obtained transfer function, comprising: under a condition of giving a target approximation order, approximately expressing a function as a ratio of two groups of rational polynomials by using a Pade approximation method;

wherein the output voltage of the battery system comprises an open-circuit potential between a positive electrode and a negative electrode of the battery system, which is related to a surface ion concentration in solid-phase particles; wherein the open-circuit potential between the positive electrode and the negative electrode of the battery system is a function of surface ion concentrations of particles of the positive electrode and negative electrode in the battery system, and there is a one-to-one correspondence between the potential and surface lithium-ion concentrations of the positive electrode and the negative electrode; in a lithium-ion battery, a ratio of the surface ion concentration in the solid-phase particles to a maximum ion concentration in an electrode is defined as a chemical equivalent $\theta = c_{s,sur}/c_{c,max}$, $c_{s,sur}$ is the surface lithium-ion concentration, and $c_{s,max}$ is the maximum lithium-ion concentration;

by establishing a relationship between the surface ion concentration of the particles and the current, establishing a relationship between the open-circuit potential between the positive electrode and the negative electrode and the current in the battery system; and describing an ion concentration control equation and boundary conditions in a solid-phase electrode by Fick's second diffusion law:

$$\frac{\partial c_s(x, t)}{\partial t} = \frac{\partial}{\partial x}\left(D_s \frac{\partial c_s(x, t)}{\partial x}\right),$$

where, $c_s$ is an ion concentration of lithium ions in spherical particles of the solid-phase electrode, t is time distribution dimension of the lithium ions, x is space distribution dimension of the lithium ions, ∂ is a variational symbol, $c_s(x,t)$ represents an ion concentration of the lithium ions in the solid-phase electrode at time t at electrode coordinates x, ∂t represents a variation of t, ∂x represents a variation of x, $\partial c_s(x, t)$ represents a variation of $c_s(x, t)$; the boundary conditions corresponding to the equation are as follows:

$$D_s \frac{\partial c_s(x, t)}{\partial x}\bigg|_{x=L_s} = 0;$$

$$D_s \frac{\partial c_s(x, t)}{\partial x}\bigg|_{x=0} = -\frac{j^{Li}(x, t)}{F};$$

where, $D_s$ is a diffusion coefficient of the lithium ions in the spherical particles of the solid-phase electrode, $j^{Li}(x,t)$ is electrochemical reaction rate of the positive electrode and the negative electrode at time t at x, $L_s$ is an electrode thickness, and F is a Faraday constant with a value of 96487 C/mol;

obtaining an unsteady partial differential equation by obtaining an analytical solution of a transfer function of the ion concentration of the solid-phase electrode to the current, and subjecting the partial differential equation to Laplace transform, and solving the partial differential equation subjected to the Laplace transform in the s domain, to obtain a transfer function of the surface ion concentration $C_s(0, s)$ of the particles of the solid-phase-electrode and $C_s(x=Ls, s)$ to the electrochemical reaction rate $J^{Li}(x, s)$ as follows:

$$\frac{C_s(0, s)}{j^{Li}(s)} = \frac{1 + \exp\left(2L_s\sqrt{\frac{s}{D_s}}\right)}{\sqrt{D_s s}\, F\left(-1 + \exp\left(2L_s\sqrt{\frac{s}{D_s}}\right)\right)};$$

$$\frac{C_s(L_s, s)}{j^{Li}(s)} = \frac{2\exp\left(L_s\sqrt{\frac{s}{D_s}}\right)}{\sqrt{D_s s}\, F\left(-1 + \exp\left(2L_s\sqrt{\frac{s}{D_s}}\right)\right)};$$

wherein $J^{Li}(s)$ is Laplace transform of $J^{Li}(x, s)$;

generating a certain overvoltage at a contact position between the positive electrodes and the negative electrode of the battery system and an electrolyte due to electrochemical reaction, describing a reaction process by Bulter-Volmer equation:

$$j^{Li}(x, t) = i_0\left[\exp\left(\frac{a_a F}{RT}\eta(x, t)\right) - \exp\left(-\frac{a_c F}{RT}\eta(x, t)\right)\right];$$

where, $a_a$ and $a_c$ are transfer coefficients of an anode and a cathode, respectively, with a value of 0.5; $\eta(x,t)$ is an electrode overvoltage, $i_0$ is an electrode reaction exchange current density, R is an ideal gas constant, which is 8.3143 j/(mol k), and T is a thermodynamic temperature;

subjecting an exponential function at a right end of the Bulter-Volmer equation to first-order Taylor expansion at a zero point, and then to Laplace transform to obtain following relationship:

$$j^{Li}(x, s) = \frac{i_0(a_a + a_c)F}{RT} N(x, s),$$

where, $N(x,s)$ is overpotential of the electrochemical reaction of the battery system;

obtaining a transfer function of the overpotential to the electrochemical reaction rate after Laplace transform in the electrochemical model of the solid-state lithium battery:

$$\frac{N(x, s)}{J^{Li}(x, s)} = \frac{RT}{i_0(a_a + a_c)F};$$

in view of an electrolyte potential control equation in electrochemical equation involving electrolyte potential and lithium-ion concentration in the electrolyte, based on a linearization of the equation, expressing a simplified equation as follows:

$$\kappa^{eff} \frac{\partial^2 \phi_e(x, t)}{\partial x^2} + \frac{\kappa_d^{eff}}{c_{e,0}} \frac{\partial^2 c_e(x, t)}{\partial x^2} + j^{Li}(x, t) = 0;$$

where, $\phi_e(x, t)$ is an electrolyte potential difference at time t at x of the electrolyte, $c_e(x, t)$ is the ion concentration of the lithium ions at time t at x of the electrolyte, and $k_d^{eff}$ represents effective ion diffusion conductivity of the electrolyte;

carrying out a mathematical integration operation along x direction to obtain:

$$\kappa^{eff} \frac{\partial^2 \phi_e(x, t)}{\partial x} - \kappa^{eff} \frac{2RT(1 - t_+^0)}{Fc_{e,0}} \frac{\partial c_e(x, t)}{\partial x} + \int_0^x j^{Li}(x, t) d\xi = 0;$$

where, $t_+^0$ represents ion transfer rate of the lithium ions in an electrolyte solution considering an electrolyte solution rate, $\partial \phi_e(x,t)$ represents a variation of $\phi_e(x, t)$, $\partial c_e(x, t)$ represents a variation of the $c_s(x, t)$, and $\xi$ represents an integral factor;

carrying out a mathematical integration operation again along the x direction to obtain an expression of the electrolyte potential difference in the electrochemical model:

$$\phi_e(x, t) - \phi_e(0, t) = \int_0^x \left( \frac{2RT(1 - t_+^0)}{c_{e,0}F} \frac{\partial c_e(\xi, t)}{\partial \xi} \right) d\xi + \frac{I(t)L}{A\kappa^{eff}};$$

where, L is a length of an electrolyte region, $k^{eff}$ is effective conductivity of the electrolyte, I(t) is a load current, $\partial c_e(\xi, t)$ represents a variation of $c_e(\xi, t)$, $c_e(\xi, t)$ is the ion concentration of the lithium ions at $\xi$ of the electrolyte at time t, $\partial \xi$ represents a variation of $\xi$, and $\xi$ represents an integral factor;

as the lithium ions in the electrolyte are distributed in a whole battery region, expressing a matter conservation equation of the lithium ions in the electrolyte as follows:

$$\frac{\partial c_e(x, t)}{\partial t} = D_e^{eff} \frac{\partial^2 c_e(x, t)}{\partial x^2},$$

where, $D_e^{eff}$ is an effective diffusion coefficient of the lithium ions in the electrolyte; and obtaining a transfer function of the electrolyte potential difference to the current by combining a relationship between the electrochemical reaction rate and the current:

$$\frac{\Delta \Phi_e(s)}{I(s)} = \frac{\Phi_e(L, s) - \Phi_e(0, s)}{I(s)} =$$

$$\frac{2RT(1 - t_+^0)}{c_{e,0}F} \left( \frac{C_e(L, s)}{J_p^{Li}(s)} \frac{J_p^{Li}(s)}{I(s)} - \frac{C_e(0, s)}{J_n^{Li}(s)} \frac{J_n^{Li}(s)}{I(s)} \right) + \frac{L}{A\kappa^{eff}}$$

where, $\Delta \Phi_e(s)$ is a change rate of an internal potential in the battery system, I(s) is a Laplace transform of the battery current, $\Phi_e(L, s)$ is the internal potential of the battery system, A is an area of an electrode plate, L is the length of the electrolyte region, $\kappa^{eff}$ is the effective conductivity of the electrolyte, $c_{e,0}$ is an initial concentration of the electrolyte, $C_e(L, s)$ is Laplace transform of an electrolyte concentration at L, and $J_p^{Li}(s)$ and $J_n^{Li}(s)$ are reaction rates of the positive electrode and the negative electrode, respectively; and monitoring, by the battery management system, the state of the solid-state lithium battery according to the lithium ion concentration, the battery open-circuit voltage, the SEI and the negative electrode lithium deposition estimated of the solid-state lithium battery, wherein the state of the solid-state lithium battery comprises a state of charge of the battery, a state of health of the battery, a state of power of the battery, and a temperature of the battery.

2. The electrochemical model-based method for estimating the state of the solid-state lithium battery according to claim 1, wherein the model construction step further comprises: constructing the electrochemical model, which comprises establishing a transfer function between an output voltage and an input current of the solid-state lithium battery.

3. The electrochemical model-based method for estimating the state of the solid-state lithium battery according to claim 2, wherein the model construction step further comprises: transforming and solving an internal electrochemical reaction control equation of the solid-state lithium battery to establish a transfer function of a battery terminal voltage to a voltage, and performing order reduction on the transfer function to obtain a rational transfer function based on electrochemical parameters.

4. The electrochemical model-based method for estimating the state of the solid-state lithium battery according to claim 1, wherein the model construction step further comprises: obtaining the electrochemical model by modeling, solving and simplifying partial differential control equations for expressing various parts inside the solid-state lithium battery.

5. The electrochemical model-based method for estimating the state of the solid-state lithium battery according to claim 1, wherein the simulation model is subjected to mathematical decoupling and model discretization to generate model code, and the model code is imported into the battery management system to estimate the state of the solid-state lithium battery.

6. An electrochemical model-based system for estimating a state of a solid-state lithium battery, comprising a processor, a memory storing program, and a battery measuring system for detecting a current, a voltage, an impedance, and a temperature of the solid-state lithium battery, wherein the processor performs the stored program codes for:

receiving the current, the voltage, the impedance and the temperature of the solid-state lithium battery detected by the battery measuring system;

estimating, according to the current, the voltage, the impedance and the temperature of the solid-state lithium battery, lithium ion concentration, battery open-circuit voltage, solid electrolyte interface (SEI) for characterizing battery aging and negative electrode lithium deposition of the solid-state lithium battery, by using an electrochemical model of the solid-state lithium battery; wherein the electrochemical model of the solid-state lithium battery is flashed into the memory as follow:

a model construction step, for constructing the electrochemical model of the solid-state lithium battery; and a code generation step, for building a simulation model of the electrochemical model for simulation such that a mathematical relationship between external characterization parameters of the solid-state lithium battery, comprising the voltage, the current, the impedance and the temperature, and internal electrochemical parameters of the solid-state lithium battery, comprising the lithium ion concentration, the battery open-circuit voltage, the SEI and the negative electrode lithium deposition, is established, converting the simulation model after simulated into executable code and importing the executable code into a battery management system for estimating the state of the solid-state lithium battery;

wherein the model construction step comprises:
solving a control equation of a battery electrochemical model in an s domain; and assuming that an input of a battery system is a current I, and an output is a voltage V, obtaining a transfer function G(s) of the battery system as follows:

$$G(s) = \frac{V(s)}{I(s)} = \frac{a_0 + a_1 s + \ldots + a_n s^n}{b_0 + b_1 s + \ldots + b_m s^m};$$

where, s to $s^n$ and s to $s^m$ are divided regions in the s domain inside the battery system, $a_0$ to $a_n$ are divided regions of a battery voltage in the s domain, $b_0$ to $b_m$ are divided regions of a battery current in the s domain, I(s) is Laplace transform of an input current, V(s) is Laplace transform of an output voltage, n represents a number of terms of a numerator part of Pade approximation, and m represents a number of terms of a denominator part of the Pade approximation;

obtaining a transfer function of the output voltage of the battery system to the input current as an impedance model of the battery system, by obtaining transfer functions of respective voltage components in the battery system with respect to the current I and adding the transfer functions;

as equations involved in the battery system are nonlinear, and transfer function obtained in a process of solving is probably not in the form of rational polynomial, simplifying the obtained transfer function, comprising: under a condition of giving a target approximation order, approximately expressing a function as a ratio of two groups of rational polynomials by using a Pade approximation method;

wherein the output voltage of the battery system comprises an open-circuit potential between a positive electrode and a negative electrode of the battery system, which is related to a surface ion concentration in solid-phase particles; wherein the open-circuit potential between the positive electrode and the negative electrode of the battery system is a function of surface ion concentrations of particles of the positive electrode and negative electrode in the battery system, and there is a one-to-one correspondence between the potential and surface lithium-ion concentrations of the positive electrode and the negative electrode; in a lithium-ion battery, a ratio of the surface ion concentration in the solid-phase particles to a maximum ion concentration in an electrode is defined as a chemical equivalent $\theta c_{s,sur}/c_{c,max}$; $c_{s,sur}$ is the surface lithium-ion concentration, and $c_{s,max}$ is the maximum lithium-ion concentration;

by establishing a relationship between the surface ion concentration of the particles and the current, establishing a relationship between the open-circuit potential between the positive electrode and the negative electrode and the current in the battery system; and describing an ion concentration control equation and boundary conditions in a solid-phase electrode by Fick's second diffusion law:

$$\frac{\partial c_s(x,t)}{\partial t} = \frac{\partial}{\partial x}\left(D_s \frac{\partial c_s(x,t)}{\partial x}\right),$$

where, $c_s$ is an ion concentration of lithium ions in spherical particles of the solid-phase electrode, t is time distribution dimension of the lithium ions, x is space distribution dimension of the lithium ions, ∂ is a variational symbol, $c_s(x,t)$ represents an ion concentration of the lithium ions in the solid-phase electrode at time t at electrode coordinates x, ∂t represents a variation of t, ∂x represents a variation of x, ∂$c_s$(x, t) represents a variation of $c_s$(x, t); the boundary conditions corresponding to the equation are as follows:

$$D_s \frac{\partial c_s(x, t)}{\partial x}\bigg|_{x=L_s} = 0;$$

$$D_s \frac{\partial c_s(x, t)}{\partial x}\bigg|_{x=0} = -\frac{j^{Li}(x, t)}{F};$$

where, $D_s$ is a diffusion coefficient of the lithium ions in the spherical particles of the solid-phase electrode, $j^{Li}(x,t)$ is electrochemical reaction rate of the positive electrode and the negative electrode at time t at x, $L_s$ is an electrode thickness, and F is a Faraday constant with a value of 96487 C/mol;

obtaining an unsteady partial differential equation by obtaining an analytical solution of a transfer function of the ion concentration of the solid-phase electrode to the current, and subjecting the partial differential equation to Laplace transform, and solving the partial differential equation subjected to the Laplace transform in the s domain, to obtain a transfer function of the surface ion concentration $C_s(0, s)$ of the particles of the solid-phase-electrode and $C_s(x=L_s, s)$ to the electrochemical reaction rate $J^{Li}(x, s)$ as follows:

$$\frac{C_S(0, s)}{J^{Li}(s)} = \frac{1 + \exp\left(2L_s\sqrt{\frac{s}{D_s}}\right)}{\sqrt{D_s s} F\left(-1 + \exp\left(2L_s\sqrt{\frac{s}{D_s}}\right)\right)};$$

$$\frac{C_s(0, s)}{J^{Li}(s)} = \frac{2\exp\left(L_s\sqrt{\frac{s}{D_s}}\right)}{\sqrt{D_s s} F\left(-1 + \exp\left(2L_s\sqrt{\frac{s}{D_s}}\right)\right)};$$

wherein $J^{Li}(s)$ is Laplace transform of $J^{Li}(x, s)$;

generating a certain overvoltage at a contact position between the positive electrodes and the negative electrode of the battery system and an electrolyte due to electrochemical reaction, describing a reaction process by Bulter-Volmer equation:

$$j_{Li}(x, t) = i_0\left[\exp\left(\frac{a_a F}{RT}\eta(x, t)\right) - \exp\left(-\frac{a_c F}{RT}\eta(x, t)\right)\right];$$

where, $a_a$ and $a_c$ are transfer coefficients of an anode and a cathode, respectively, with a value of 0.5; $\eta(x,t)$ is an electrode overvoltage, $i_0$ is an electrode reaction exchange current density, R is an ideal gas constant, which is 8.3143 j/(mol k), and T is a thermodynamic temperature;

subjecting an exponential function at a right end of the Bulter-Volmer equation to first-order Taylor expansion at a zero point, and then to Laplace transform to obtain following relationship:

$$j^{Li}(x, s) = \frac{i_0(a_a + a_c)F}{RT}N(x, s),$$

where, N(x,s) is overpotential of the electrochemical reaction of the battery;

obtaining a transfer function of the overpotential to the electrochemical reaction rate after Laplace transform in the electrochemical model of the solid-state lithium battery:

$$\frac{N(x, s)}{J^{Li}(x, s)} = \frac{RT}{i_0(a_a + a_c)F};$$

in view of an electrolyte potential control equation in electrochemical equation involving electrolyte potential and lithium-ion concentration in the electrolyte, based on a linearization of the equation, expressing a simplified equation as follows:

$$\kappa^{eff}\frac{\partial \Phi_e(x, t)}{\partial x^2} + \frac{\kappa_d^{eff}}{c_{e,0}}\frac{\partial^2 c_e(x, t)}{\partial x^2} + j^{Li}(x, t) = 0;$$

where, $\phi_0(x,t)$ is an electrolyte potential difference at time t at x of the electrolyte, $c_e(x, t)$ is the ion concentration of the lithium ions at time t at x of the electrolyte, and $k_d^{eff}$ represents effective ion diffusion conductivity of the electrolyte;

carrying out a mathematical integration operation along x direction to obtain:

$$\kappa^{eff}\frac{\partial \Phi_e(x, t)}{\partial x} - \kappa^{eff}\frac{2RT(1 - t_+^0)}{Fc_{e,0}}\frac{\partial c_e(x, t)}{\partial x} + \int_0^x j^{Li}(x, t)d\xi = 0;$$

where, $t_+^0$ represents ion transfer rate of the lithium ions in an electrolyte solution considering an electrolyte solution rate, $\partial \phi_e(x, t)$ represents a variation of $\phi_e(x, t)$, $\partial c_e(x,t)$ represents a variation of the $c_e(x, t)$, and $\xi$ represents an integral factor;

carrying out a mathematical integration operation again along the x direction to obtain an expression of the electrolyte potential difference in the electrochemical model:

$$\phi_e(x, t) - \phi_e(0, t) = \int_0^x \left(\frac{2RT(1 - t_+^0)}{c_{e,0}F}\frac{\partial c_e(\xi, t)}{\partial \xi}\right)d\xi + \frac{I(t)L}{A\kappa^{eff}}$$

where, L is a length of an electrolyte region, $k^{eff}$ is effective conductivity of the electrolyte, I(t) is a load current, $\partial c_e(\xi,t)$ represents a variation of $c_e(\xi, t)$, $c_e(\xi, t)$ is the ion concentration of the lithium ions at $\xi$ of the electrolyte at time t, $\partial\xi$ represents a variation of $\xi$, and $\xi$ represents an integral factor;

as the lithium ions in the electrolyte are distributed in a whole battery region, expressing a matter conservation equation of the lithium ions in the electrolyte as follows:

$$\frac{\partial c_e(x, t)}{\partial t} = D_e^{eff}\frac{\partial^2 c_e(x, t)}{\partial x^2},$$

where, $D_e^{eff}$ is an effective diffusion coefficient of the lithium ions in the electrolyte; and obtaining a transfer function of the electrolyte potential difference to the current by combining a relationship between the electrochemical reaction rate and the current:

$$\frac{\Delta\Phi_e(s)}{I(s)} = \frac{\Phi_e(L,s) - \Phi_e(0,s)}{I(s)} = $$

$$\frac{2RT(1-t_+^0)}{c_{e,0}F}\left(\frac{C_e(L,s)}{J_p^{Li}(s)}\frac{J_p^{Li}(s)}{I(s)} - \frac{C_e(0,s)}{J_n^{Li}(s)}\frac{J_n^{Li}(s)}{I(s)}\right) + \frac{L}{A\kappa^{eff}}$$

where, $\Delta\Phi_e(s)$ is a change rate of an internal potential in the battery, I(s) is a Laplace transform of the battery current, $\Phi_e(L, s)$ is the internal potential of the battery, A is an area of an electrode plate, L is the length of the electrolyte region, $\kappa^{eff}$ is the effective conductivity of the electrolyte, $c_{e,0}$ is an initial concentration of the electrolyte, $C_e(L, s)$ is Laplace transform of an electrolyte concentration at L, and $J_p^{Li}(s)$ and $J_n^{Li}(s)$ are reaction rates of the positive electrode and the negative electrode, respectively;

wherein the state of the solid-state lithium battery is monitored by the battery management system according to the lithium ion concentration, the battery open-circuit voltage, the SEI and the negative electrode lithium deposition estimated of the solid-state lithium battery, wherein the state of the solid-state lithium battery comprises a state of charge of the battery, a state of health of the battery, a state of power of the battery, and a temperature of the battery.

7. The electrochemical model-based system for estimating the state of the solid-state lithium battery according to claim 6, wherein the model construction step further comprises: constructing the electrochemical model, which comprises establishing a transfer function between an output voltage and an input current of the solid-state lithium battery.

8. The electrochemical model-based system for estimating the state of the solid-state lithium battery according to claim 7, wherein the model construction step further comprises: transforming and solving an internal electrochemical reaction control equation of the solid-state lithium battery to establish a transfer function of a battery terminal voltage to a voltage, and performing order reduction on the transfer function to obtain a rational transfer function based on electrochemical parameters.

9. The electrochemical model-based system for estimating the state of the solid-state lithium battery according to claim 6, wherein the model construction step further comprises: obtaining the electrochemical model by modeling, solving and simplifying partial differential control equations for expressing various parts inside the solid-state lithium battery.

10. The electrochemical model-based system for estimating the state of the solid-state lithium battery according to claim 6, wherein the simulation model is subjected to mathematical decoupling and model discretization to generate model code, and the model code is imported into the battery management system to estimate the state of the solid-state lithium battery.

\* \* \* \* \*